United States Patent [19]

Botta et al.

[11] 3,912,770

[45] Oct. 14, 1975

[54] ESTER ISOCYANATES

[75] Inventors: Arthur Botta, Krefeld-Gartenstadt; Heinrich Krimm, Krefeld-Bockum, both of Germany

[73] Assignee: Bayer Aktiengesellschaft, Germany

[22] Filed: Mar. 9, 1970

[21] Appl. No.: 17,961

[30] Foreign Application Priority Data
Mar. 15, 1969 Germany.................. 1913273

[52] U.S. Cl.......... 260/404; 260/31.2; 260/239.3 R; 260/389; 260/465.4; 260/465.5 R; 260/465.6; 260/465.9; 260/465 D; 260/465 F; 260/465 K; 260/468 L; 260/469; 260/471 R; 260/475 R; 260/475 SC; 260/478; 260/479 R; 260/479 S; 260/481 R; 260/482 R; 260/484 R; 260/485 H; 260/485 L; 260/485 N; 260/485 P
[51] Int. Cl.² .......................................... C09F 7/00
[58] Field of Search....... 260/404, 478, 482, 534 M, 260/239.3 R, 454

[56] References Cited
UNITED STATES PATENTS

| | | | |
|---|---|---|---|
| 2,643,264 | 6/1953 | Fauser | 260/453 A |
| 3,281,378 | 10/1966 | Garber et al. | 260/478 |
| 3,412,156 | 11/1968 | Veda et al. | 260/239.3 |
| 3,467,695 | 9/1969 | Holtschmidt et al. | 260/482 |

FOREIGN PATENTS OR APPLICATIONS

| | | | |
|---|---|---|---|
| 1,241,440 | 6/1967 | Germany | 260/454 |

OTHER PUBLICATIONS

Meyer, "Reaction Products of Caprolactam, etc.," CA52, p. 11781 (1958).

Houben-Weyl "Lactimather," 11/2, pp. 578–580.

*Primary Examiner*—Glennon H. Hollrah
*Attorney, Agent, or Firm*—Joseph C. Gil

[57] ABSTRACT

Ester isocyanates are prepared by phosgenating lactimethers at the phase boundary of water and an inert organic solvent in the presence of a substance which undergoes a neutralization reaction with hydrogen chloride. These isocyanates are useful as precursors in the production of lacquers, polyurethane foams, pharmaceuticals, herbicides and plasticizers.

8 Claims, No Drawings

ESTER ISOCYANATES

This invention relates to a method of preparing ester isocyanates and more particularly to ester isocyanates prepared by the phosgenation of lactimethers.

Ester isocyanates especially mono esterisocyanates are particularly suitable as starting materials for the preparation of plasticizers for PVC of the kind disclosed in U.S. Pat. No. 3,078,301. Ester urethanes which are analogous to the N-carboalkoxy-e-aminocaproic acid esters of U.S Pat. No. 3,078,301 are easily obtainable by reacting mono esterisocyanates with alcohols. Di- or polyesterisocyanates are suitable reactants for the preparation of polyurethane plastics according to the well-known methods of the polyurethane chemistry which consist in reacting polyisocyanates with polyvalent compounds having a plurality of active hydrogen atoms. The isocyanates of the invention are particularly suitable as precursors in the preparation of lacquers, foam plastics. synthetic resins, pharmaceuticals and herbicides.

Carboxylic acid ester isocyanates of the formula [O=C=N—A—CO—O$_n$]R, wherein n is an integer of from 1 to 2, , and R is a mono- or bivalent aliphatic or aromatic radical and A is a divalent aliphatic or aromatic radical, are known in the art. They may be prepared either by phosgenating the corresponding aminocarboxylic acid esters or their hydrochlorides according to the methods described for example by W. Siefken, Ann. 562, 105 (1949), O. Diels, B. Wolff, Ber. 39, 686 (1906) and German Pat. No. 1,085,869. They may also be prepared by selective esterification of isocyanate carboxylic acid chlorides using aliphatic or aromatic hydroxyl compounds to react with the acid chloride functional group as described for example, by Y. Iwakura, K. Uno, S. Kang, J. Org. Chem. 31, 142 (1966) and German Pat. No. 1,231,688.

A major disadvantage of these processes is that it is necessary to use as starting materials, aminocarboxylic acids, which may be and frequently are obtained by saponification of their corresponding lactams. In addition to the necessity for lengthy drying times prior to subsequent reaction with acid chlorides, many individual reaction steps are required for the selective reactions involving the two different functional groups on the amino carboxylic acid.

Surprisingly it has now been discovered that ester isocyanates can be conveniently prepared in high yields by reacting lactimethers with phosgene by condensation at a phase boundary.

It is therefore an object of this invention to provide a method of preparing ester isocyanates devoid of the disadvantages inherent in the methods of the prior art. It is another object of this invention to provide a method of preparing ester isocyanates involving a lesser number of reaction stages. It is a further object of this invention to provide a method of preparing ester isocyanates which eliminates the necessity for isolation and drying of the amino carboxylic acids. It is still another object of this invention to provide a method of preparing ester isocyanates wherein large excesses of phosgene are unnecessary. Yet a further object of this invention is to provide a method of preparing ester isocyanates wherein the phosgenation reaction is practically instantaneous. A still further object of this invention is to provide ester isocyanates having a low vapor pressure, thus ensuring against physiological harm through vapor inhalation.

The foregoing objects and others which will become apparent from the following description are accomplished according to the invention, generally speaking, by reacting a lactimether with phosgene by condensation at a phase boundary in the presence of water and an inert organic solvent which is either immiscible or only slightly miscible with water, and in the presence of a substance which undergoes a neutralization reaction with hydrogen chloride; the phosgenation reaction taking place at a temperature of from about −15°C. to about 25°C. preferably from about −5°C. to about 5°C.

The reaction which leads to the formation of the ester isocyanates is represented by the following reaction mechanism.

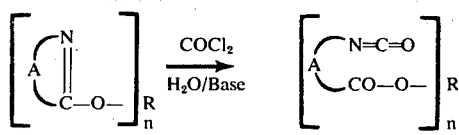

wherein $n$ is an integer of from 1 to 4, preferably 1 to 2, R is a mono- or polyvalent aliphatic, cycloaliphatic, araliphatic or aromatic radical which may contain substituents which are inert towards acid chlorides and isocyanates such as for example halogen, nitro, tert. amino, nitrilo, oxo, ether, thioether, ester etc. and A is a bivalent saturated or unsaturated aliphatic, cycloaliphatic, araliphatic or aromatic radical which may also contain substituents which are inert towards acid chlorides and isocyanates such as for example halogen, nitro, tert. amino, nitrilo, oxo, ether, thioether, ester etc.

The process according to the invention is advantageous in that, compared with the known processes for the preparation of ester isocyanates which use aminocarboxylic acids as starting materials, a lesser number of reaction stages are required and the isolation of the aminocarboxylic acid from the lactam hydrolysate, and the drying of the aminocarboxylic acids, which generally involve considerable expenditure, can be avoided. This new procedure of phosgenating lactimethers, with simultaneous hydrolytic ring opening, proceeds surprisingly smooth and constitutes a very mild method of phosgenating, so that even compounds which contain groups sensitive to acids, such as, for example ether derivatives or olefinic derivatives, which would not stand up to hot phosgenation such as is employed for the preparation of ester isocyanates from amino acids, can be used.

In contrast to the prior art processes for preparing isocyanates by phosgenating primary amines, which methods require two to five times or more of the stoichiometric quantity of phosgene, necessitating long reaction times and removal of the excess phosgene by passing a dry inert gas through the reaction mixture, the present process requires only a slight excess of phosgene, i.e. from about 10 to about 20 per cent of the calculated quantity. Moreover the reaction time is very short as the reaction is practically instantaneous, and the reaction mixture is phosgene free only seconds after phosgenation ceases.

The starting material for the process according to the invention may be any lactimether, preferably monocyclic compounds but bicyclic, polycyclic, and heterocyclic compounds may also be used. Compounds of the following general formula are particularly suitable for use according to the invention.

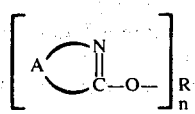

wherein n represents an integer of from 1 to 4 and preferably from 1 to 2, R is a mono- or polyvalent aliphatic, cycloaliphatic, araliphatic or aromatic radical which may contain substituents which are inert towards acid chlorides and isocyanates such as for example halogen, nitro, tert, amino, nitrilo, oxo, ether, thioether, ester etc. and A is a bivalent saturated or unsaturated aliphatic, cycloaliphatic, araliphatic or aromatic radical which may also contain substituents which are inert towards acid chlorides and isocyanates such as for example halogen, nitro, tert. amino, nitrilo, oxo, ether, thioether, ester etc.

Some suitable aliphatic radicals R are for example, methyl, ethyl, n-propyl, isopropyl, n-butyl, isobutyl, sec-butyl, t-butyl, n-pentyl, 1-, 2- and 3-methyl-butyl, 1,1-, 1,2- and 2,2-dimethylpropyl, 1-ethylpropyl, hexyl, heptyl, octyl, nonyl, decyl, undecyl, dodecyl, tridecyl, tetradecyl, pentadecyl, hexadecyl, heptadecyl, octodecyl, nondecyl, eicosyl, chloromethyl, chloroethyl, dichlorpropyl, chlorobutyl, bromopropyl, nitropropyl, dimethylaminomethyl, diethylaminoethyl, dimethylaminopropyl, methoxymethyl, ethoxyethyl, carbethoxy propyl, carbomethoxybutyl, cyanomethyl, cyanoethyl, cyanohexal, 2-oxopropyl, 3-oxobutyl, and the various isomers of ethylene propylene, isopropylene, butylene, sec-butylene, propylene, pentylene, hexylene, heptylene, octylene, nonylene, decylene, undecylene, dodecylene, tridecylene, tetradecylene, pentadecylene, hexadecylene, heptadecylene, octadecylene, nondecylene, eicosylene and the like.

Some suitable cycloaliphatic radicals R are, for example, cyclopropyl, cyclobutyl, cycloamyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctodecyl, cyclonondecyl, cycloeicosyl, 2-chlorocyclohexyl, 3-nitrocyclohexyl, 4-dimethylaminocyclohexyl, ethoxyethylcyclohexyl, carbomethoxycyclohexyl, 4-cyanocyclohexyl, 4-oxcyclohexyl, a-cyclohexyl-ethylene, b-cyclohexylethylene, a-cycloheptyl-1-propylene, b-cycloheptyl-1-propylene, g-cycloheptyl-1-propylene, a-cyclo-octyl-2-propylene, b-cyclooctyl-2-propylene, g-cyclooctyl-2-propylene, b-cyclononyl-isopropylene, a-methylene-b-cyclododecyl-ethylene and the like.

Some suitable araliphatic radicals R are for example, benzyl, a-phenyl-ethyl, b-phenyl-ethyl, a-phenyl-propyl, b-phenyl-propyl, g-phenyl-propyl, a-phenyl-isopropyl, b-phenyl-isopropyl, a-phenyl-butyl, b-phenyl-butyl, g-phenyl-butyl, d-phenyl-butyl, a-phenyl-isobutyl, b-phenyl-isobutyl, g-phenyl-isobutyl, a-phenyl-sec-butyl, b-phenyl-sec-butyl, g-phenyl-secbutyl, b-phenyl-t-butyl, a'-naphthyl-methyl, b'-naphthyl-methyl and the like.

Some suitable aromatic radicals R are, for example, phenyl, a-naphthyl, b-naphthyl, a-anthryl, b-anthryl, g-anthryl, tolyl, indene, isoindene, acenaphthene, fluorene, phenanthrene, naphthacene, chrysene, pyrene, triphenylene and the like.

Some suitable aliphatic radicals A are for example

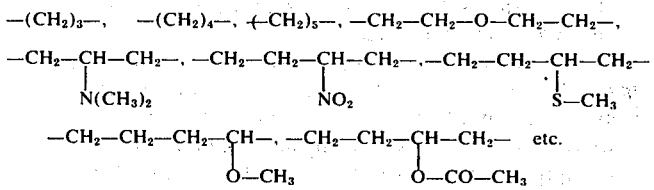

Some suitable cycloaliphatic radicals A are for example cyclohexylene, methylcyclohexylene, cyclopropylene, cyclobutylene, hexachlorocyclohexylene, hexafluorocyclohexylene, dimethylaminocyclohexylene etc.

Some suitable araliphatic radicals A are for example

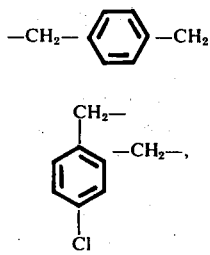

Some suitable aromatic radicals A are for example 1,2-, 1,3- or 1,4-phenylene, 1-nitro-2,5-phenylene, 1,5-naphthylene, 4,4'-diphenylene, tetrachloro-1,2-, -1,3- or -1,4-phenylene etc.

The lactimethers to be used according to the invention may be prepared for example by reacting lactams with phosgene and hydroxyl compounds (Houben-Weyl, Methoden der organischen Chemie, volume XI/2, page 778) or by transetherification of lactim-methyl-ethers with hydroxy compounds according to U.S. Pat. No. 2,516,293.

Any suitable lactam may be used, some of which are, for example, 3,3-dimethyl-3-propiolactam, 2-phenyl-propiolactam, 2,3-diphenylpropiolactam, 4-butyrolactam, 5-valerolactam, 6-caprolactam, 4-oxo-6-caprolactam, a-chlorocaprolactam, a-nitrocaprolactam, a,a-dichloro-caprolactam, a- to e-methylcaprolactams, a- to e-phenylcaprolactams, γ-(dimethyl-sila)caprolactam, 7-oenantholactam, 8-caprylolactam, 12-laurylolactam, pyrrolinone-2, oxazolidinone-5, 2-oxo-6-methyl-1,2,3,4-tetrahydropyridine, 3-oxo-morpholine, 3-oxo-thiomorpholine, 2-oxo-4-methyl-piperazine, b-oxacaprolactam, g-thiocaprolactam, d-(phenyl-aza)- caprolactam, 2-oxo-indoline, 1-oxo-isoindoline, 2-oxo-tetrahydroindoline, isatine, 2-oxo-1,2,3,4-tetrahydroquinoline, 2-oxo-1 to 8-octahydroquinoline, 2-oxo-1 to 10-decahydroquinoline, 2,4-dioxo-1 to 10-decahydroquinoline, 3-oxo-benzmorpholine, 2-oxo-tetrahydrobenzazepine, and the like; dilactams such as for example, cyclodicaprolactam, g,g'-biscaprolactam, methylene-bis-caprolactam, g,g'-iso-propylidene-bis-caprolactam, 1,5-diaza-2,6-dioxo-cyclooctane, 2,6-dioxo-decahydro-1,5-naphthyridin, and the like.

To prepare the lactim ethers, the lactams are reacted successively with phosgene and a hydroxyl compound at temperatures of from about −15°C. to about +30°C. for from about 3 to about 8 hours.

One advantageous embodiment of the process of this invention consists of using lactimethers prepared in situ in the form of hydrochlorides as starting material, without an intermediate isolation step. An additional quantity of material which undergoes an addition reaction with hydrogen chloride, corresponding to the quantity of hydrogen chloride bound as hydrochloride, is used for the subsequent phosgenation.

Any suitable mono- to tetrafunctional hydroxyl compounds having preferably a molecular weight up to 400 may be used to prepare the lactimethers, such as, for example, methanol, ethanol, propanol, isopropanol, butanol, decanol, stearyl alcohol, allyl alcohol, crotonyl alcohol, 1-methyl-1-ethynyl-ethanol, 2-fluorethanol, 2-chloroethanol, trichloroethanol, di- and tribromoethanol, pentafluoroethanol, 3-chloropropanol, di-chloropropanol, 2-dimethylaminoethanol, hydroxypropyl methacrylate, 2-hydroxyethylacetate, glycol monomethyl ether, glycol monoallyl ether, ethylene cyanhydrine, acetonecyanhydrine, 2-(cyanethoxy)-ethanol, cyclohexanol, benzyl alcohol, phenylethyl alcohol, phenylallyl alcohol, m-bromobenzyl alcohol, p-nitrobenzyl alcohol, p-cyanbenzylalcohol, benzene sulfonic acid hydroxy ethyl ester, phosphoric acid diethyl hydroxy cyclohexyl ester, ethylene glycol, propylene glycol, butylene glycol, neopentyl glycol, hexanediol, 2,2'-dihydroxydiethyl ether, 2,2'-dihydroxydiethylsulphide, dihydroxydiethylsulfone, N,N'-bis-(2-hydroxyethyl)-aniline, dihydroxydiethylketone, dihydroxydiethoxy dimethylsilane, butyne-2-diol-(1,4), 2,2-bis-(p-hydroxyethoxyphenyl)propane, dihydroxycyclohexane, 1,4-bis-hydroxymethyl-benzene, glycerol, trimethylolpropane, 2-ethyl-2-hydroxymethyl-propane, 2-ethyl-2-hydroxymethyl-propane-1,3-diol, O,O',O''-tris-(2-hydroxypropyl)-2-ethyl-2-hydroxymethylpropane diol-(1,3), triethanolamine, pentaerythritol, N,N,N',N'-tetra-(2-hydroxyethyl)-ethylene diamine, phenol, o-, m- and p-chlorophenol, trichlorophenol, o-, m- and p-isopropenylphenol, p-hydroxyacetophenone, 1- and 2-napthanol, p-hydroxybenzylalcohol, pyrocatechol, resorcinol, hydroquinone, dihydroxyphenylmethane, 2,2-bis-(p-hydroxyphenyl)-propane, 4,4'-dihydroxydiphenylether, 4,4'-dihydroxydiphenylsulphone, dihydroxynaphthalene, phloroglucine, pyrogallol and the like.

Any compound which undergoes a neutralization reaction with or adds on hydrogen chloride may be used, some of which are, for example, alkali metal or alkaline earth metal oxides, hydroxides, carbonates and bicarbonates, and also alkali metal and alkaline earth metal salts of weak inorganic or organic acids, such as, for example, borates and acetates, or tertiary amines. It is particularly advantageous to use sodium, potassium, calcium or barium hydroxides, sodium, potassium, calcium or barium carbonates, and sodium, potassium, calcium or barium bicarbonates. These substances may be used as either aqueous solutions or suspensions.

As previously mentioned, the process according to the invention is carried out by way of condensation at the phase boundary between water and an inert solvent which solvent is immiscible with the water or only miscible with water to a very limited extent which means that the misciblity of the solvents in water should preferably be smaller than 1% by weight at 20°C. Any solvent possessing these properties is suitable for use, some examples of which are hydrocarbons such as, petroleum ether, ligroin, hexane, cyclohexane, cyclohexene, benzene, toluene, xylene, cumene, and the like; chlorinated hydrocarbons such as for example methylene chloride, ethyl chloride, chloroform, carbon tetrachloride, ethylene chloride, trichloroethylene, propylchloride, isobutylchloride, cyclohexyl chloride, chlorobenzene, chlorotoluene, dichlorobenzene trichlorobenzene, and the like; ethers such as for example diethylether, diisopropylether, dioctylether, anisole, diphenyl ether and the like; esters such as for example methylformate, methyl acetate, ethylacetate, butyl acetate, methyl glycol acetate and the like; ketones such as for example methyl isobutyl ketone, diisopropyl ketone, diisobutyl ketone, acetophenone and the like.

As a rule, at least one mol of phosgene is used per mol of lactimether. However to compensate for slight losses of phosgene by saponification, it is advantageous to use an excess of from about 10 to about 20 per cent of the calculated quantity, although a larger excess is not detrimental.

The quantity of the substance which adds on hydrogen chloride is generally about two equivalents per mol of phosgene used. Although it is advantageous to control the pH in a range between about 5 and about 14, and preferably from about 7.5 to about 9.5, maintaining a certain pH value is not critical in carrying out the process according to the invention.

The reaction temperature is limited to a minimum value by the freezing point of water and to a maximum value by the sensitivity of isocyanates and lactimethers towards saponification. It generally lies between about −15°C. and about 25°C. and preferably between about −5°C. and about 5°C.

One preferred method of carrying out the process of the invention consists, for example, in introducing the lactimether dissolved in the inert organic solvent which is immiscible with water, and the aqueous solution or suspension of the substance which undergoes a neutralization reaction with hydrogen chloride into a reaction vessel with cooling, and finally introducing the phosgene into the reaction mixture with vigorous stirring. Alternatively, the phosgene and the lactimether may be introduced simultaneously into the substance which adds on hydrogen chloride, or phosgene and the aqueous solution or suspension of the substance which adds on hydrogen chloride may be introduced simultaneously into the solution of the lactimether.

The ester isocyanates are worked up by removing the organic phase from the reaction mixture, drying and concentrating by evaporation, followed by distillating or recrystallizing.

The invention is further illustrated but is not meant to be limited by the following examples, in which all parts are by weight, unless otherwise specified.

EXAMPLE 1

A solution of about 130 parts of 45% sodium hydroxide in about 150 parts by volume of water is introduced in the course of about 15 minutes into a vigorously stirred mixture of about 400 parts by volume of methylene chloride, 100 parts by volume of water, 5 parts of sodium bicarbonate and 50 parts (0.5 mol) of butyrolactim-O-methylether, the reaction mixture being cooled with a freezing mixture to from 0° to about −5°C. with 60 parts of phosgene being introduced at the same time. The temperature is kept at about 0°C. for about 5 minutes with vigorous stirring. The organic phase is removed, and the aqueous phase is washed with about 100 parts by volume of methylene chloride. The organic phase and the methylene chloride washings are then dried over sodium sulphate. After concentration by evaporation under reduced pressure, the liquid remaining behind is fractionally distilled. About 60.5 parts (84.5% of theoretical) of the methyl ester of 4-isocyanato-butyric acid which is a liquid with a boiling point of 88°C. at 10 mm Hg are obtained.

$$O=C=N-(CH_2)_3-CO-OCH_3$$

NCO calculated: 29.4%. found: 29.1%.

EXAMPLE 2

64 parts (0.5 mol) of caprolactim-O-methylether are used under the same conditions as in Example 1 instead of butyrolactim-O-methylether. After fractional distillation, about 80 parts (93.4% of theoretical) of 6-isocyanatocaproic acid methyl ester, a colorless liquid with a boiling point of 130°C. at 18 mm Hg are obtained.

$$O=C=N-(CH_2)_5-CO-OCH_3$$

NCO Calculated: 24.55%. found: 24.55%.

EXAMPLE 3

About 76.6 parts (0.5 mol) of caprolactim-O-allylether are used in a manner analogous to Example 1. About 90.5 parts (91.7% of theoretical) of the allyl ester of 6-isocyanatocaproic acid are thereby obtained in the form of colorless liquid with a boiling point of 148°C. at 12 mm Hg.

$$O=C=N-(CH_2)_5-CO-OCH_2-CH=CH_2$$

NCO Calculated: 21.3%. found: 21.3%.

EXAMPLE 4

About 85 parts (0.5 mol) of caprolactim-O-butyl ether are substituted for the butyrolactim-O-methylether of Example 1. About 98.6 parts (92.5% of theoretical) of 6-isocyanatocaproic acid butyl ester are obtained as a colorless liquid with a boiling point of 87°C. at 0.15 mm Hg.

$$O=C=N-(CH_2)_5-CO-OC_4H_9$$

NCO calculated: 19.7%. found: 19.5%. Example 5

In place of the butyrolactim-O-methylether about 105.7 parts (0.5 mol) of lauriclactim-O-methylether are reacted with phosgene in the same way as in Example 1. The methyl ester of 12-isocyanatolauric acid is obtained as a cololess oil with a boiling point of 120°C. at 0.05 mm Hg. The yield is about 116 parts (91% of theoretical).

$$O=C=N-(CH_2)_{11}-CO-OCH_3$$

NCO calculated: 16.45%. found: 16.5%.

EXAMPLE 6

About 95 parts (0.5 mol) of caprolactim-O-phenylether are used in the same manner as in Example 1. Following fractional distillation, e-isocyanatocaproic acid phenyl ester is obtained as a colorless oil with a boiling point of 170°C. at 3.5 mm Hg. (boiling point at 0.05 mm Hg = 135°C.). The yield is about 95 parts (81.5% of theoretical).

$$O=C=N-(CH_2)_5-CO-OC_6H_5$$

NCO calculated: 18.05% found: 18.2%.

EXAMPLE 7

About 136.7 parts (0.5 mol) of lauriclactim-O-phenylether are reacted with phosgene in the same way as in Example 1. 132 parts (83.3% of the theory) of 12-isocyanatolauric acid phenyl ester are obtained as a colorless oil with a boiling point of 170°C. at 0.07 mm Hg.

$$O=C=N-(CH_2)_{11}-CO-OC_6H_5$$

NCO calculated: 13.25% found: 13.35%

EXAMPLE 8

Instead of butyrolactim-O-methylether about 70.1 parts (0.25 mol) of 1,4-butylene-bis-caprolactimether are reacted with phosgene in a manner analogous to Example 1, bis-(e-isocyanatocaproic acid)-1,4-butylene glycol ester is obtained as an almost colorless oil with a boiling point of 208°C. at 0.2 mm Hg. The yield is about 86 parts (93.2% of theoretical).

$$(O=C=N-(CH_2)_5-CO-OCH_2CH_2)_2$$

NCO calculated:22.8%. found:22.9%.

EXAMPLE 9

About 77.1 parts (0.25 mol) of 1,6-hexamethylene-biscaprolactim-ether are reacted with phosgene in the same way as in Example 1. Bis-(e-isocyanatocaproic acid)-O,O'-hexamethyleneglycol 1,6-diester is obtained in a colorless oil with a boiling point of 223°C. at 0.2 mm Hg. The yield is about 82.5 parts (83.3% of theoretical).

$$(O=C=N-(CH_2)_5-CO-OCH_2CH_2CH_2)_2$$

NCO calculated: 21.2%. found: 21.0%.

EXAMPLE 10

In place of butyrolactim-O-methylether about 74 parts (0.25 mol) of diglycol-O,O'-biscaprolactimether is reacted with phosgene in a manner analogous to Example 1. About 77 parts (80% of theoretical) of bis-(e-isocyanatocaproic acid)-diglycol ester are obtained as a colorless oil with a boiling point of 215°C. at 0.2 mm Hg.

$$(O=C=N-(CH_2)_5-CO-O-CH_2CH_2)_2O$$

NCO calculated: 21.9%. found:21.6%.

EXAMPLE 11

About 78 parts (0.25 mol) of thiodiglycol-O,O'-bis-caprolactim ether are reacted with phosgene in the same way as in Example 1. After distillation with decomposition, about 70 parts (70% of theoretical) of bis-(e-isocyanatocaproic acid)-thiodigylcol ester are obtained as a yellowish oil with a boiling point of 258°C. at 0.7 mm Hg.

(O=C=N—(CH$_2$)$_5$—CO—O—CH$_2$CH$_2$—)$_2$S

NCO calculated: 21.0%. found: 20.7%.

EXAMPLE 12

A solution of about 113 parts (1 mol) of caprolactam in about 300 parts by volume of toluene is introduced into a solution of about 120 parts of phosgene in about 400 parts by volume of toluene in the course of one hour with vigorous stirring and cooled with a freezing mixture to about −5°C. The temperature of the pasty reaction mixture is left to rise to about 20°C., and excess phosgene, together with part of the solvent, is distilled at this temperature into an ice-cooled receiver, to which is applied a water jet vacuum. About 29.5 parts (0.48 mol) of ethylene glycol is then introduced at about 20°C. into the reaction mixture. About 100 parts by volume of toluene are added and the two-phase mixture is vigorously stirred for about 3 hours from about at 20° to about 25°C. The reaction mixture is then cooled, poured, with stirring, into an ice cold mixture of 220 parts of 45% sodium hydroxide solution and 300 parts of ice. The entire mixture is vigorously shaken and the toluene phase is separated off. About 150 parts of water are now introduced underneath the toluene phase layer and, in a manner analogous to Example 1, the reaction mixture is then treated with about 125 parts of phosgene for about 30 minutes with vigorous stirring and cooling to about −5°C., while simultaneously a solution of about 300 parts of 45% sodium hydroxide solution in about 300 parts by volume of water is introduced dropwise. After separation, drying over Na$_2$SO$_4$ and concentration of the organic phase by evaporation, the oil remaining behind is fractionally distilled in a high vacuum. Bis-(e-isocyanatocaproic acid)-ethylene glycol diester is obtained as an almost colorless oil having a boiling point of from about 196° to about 200°C. at 0.2 mm Hg. The yield from the two stages is about 111.5 parts (68% of theoretical).

(O=C=N—(CH$_2$)$_5$—CO—O—CH$_2$—)$_2$

NCO calculated: 24.7%. found: 24.0%.

EXAMPLE 13

About 65 parts of phosgene are introduced into a vigorously stirred mixture of about 250 parts of water, 150 parts of 45% sodium hydroxide solution, 400 parts by volume of methylene chloride and 72 parts (0.165 mol) of triethanolamine-tris-caprolactimeter in the course of about 20 minutes with cooling to about −5°C. The reaction is then left to proceed for about 10 minutes at about −5°C. with stirring. The organic phase is then separated, dried over NA$_2$SO$_4$ and concentrated by evaporation. The pale brown clear oil remaining behind is freed from the last volatile constituents at 0.1 mm Hg and about 100°C. and consists of O,O',O''-tris-(e-isocyanatoproyl)-triethanolamine. The yield is about 91 parts (97.2% of theoretical).

(O=C=N—(CH$_2$)$_5$—CO—O—CH$_2$—CH$_2$—)$_3$N

NCO calculated: 22.3% found: 21.5%

EXAMPLE 14

Using same procedure as in Example 12 but substituting about 92.5 parts (0.3 mol) of O,O'O''-trishydroxypropyl-(2-ethyl-2-hydroxymethyl-propenediol-1,3) for the ethylene glycol, O,O'O''-tris-(e-isocyantocaproyl)-(2-ethyl-2-hydroxymethyl-propanediol-1,3) is obtained as a yellowish viscous oil which cannot be distilled. Purification is carried out by heating for about 15 minutes at about 200°C. and about 0.5 mm Hg which causes all the volatile components to be distilled from the residue. The yield is about 210 parts (96% of theoretical).

NCO calculated: 17.3% found: 16.5%

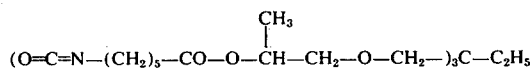
(O=C=N—(CH$_2$)$_5$—CO—O—CH—CH$_2$—O—CH$_2$—)$_3$C—C$_2$H$_5$ with CH$_3$ substituent Although, the invention has been illustrated in considerable detail by the foregoing examples, it is to be understood that many variations can be made by those skilled in the art without departing from the spirit and scope of the invention.

What is claimed is:

1. A method for the preparation of ester isocyanates which comprises reacting at a temperature of from about −15°C. to about 25°C. 1 mol of a lactimether, having the generall formula:

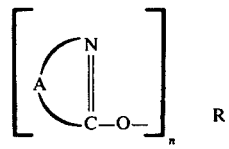

wherein $n$ is an integer of from 1 to 4, R is an n-valent aliphatic, cycloaliphatic, araliphatic or aromatic radical which may also contain halogen, nitro, nitrilo, oxo, ether, thioether, ester or tertiary amino groups and A is a bivalent aliphatic radical with at least 1 mol of phosgene in the presence of water and an inert organic solvent, the solvent being substantially immiscible with the water, in the presence of a compound which undergoes a neutralization reaction with hydrogen chloride.

2. The method of claim 1 wherein the lactimether is produced in situ by reacting the corresponding lactam with phosgene and a mono- to tetrafunctional organic hydroxyl compound having a molecular weight of up to about 400 at a temperature of from about −5°C. to about 5°C.

3. The method of claim 1 wherein the compound which undergoes a neutralization reaction with hydrogen chloride is selected from the group consisting of
   a. oxides, hydroxides, carbonates and bicarbonates of alkali metals and alkaline earth metals,
   b. alkali metal and alkaline earth metal salts of weak inorganic acids, and,
   c. alkali metal and alkaline earth metal salts of weak organic acids.

4. The method of claim 1 wherein about two equivalents of the compound which undergoes a neutralization reaction with hydrogen chloride is used per mol of lactimether.

5. The method of claim 1 wherein the lactimether is dissolved in the inert organic solvent.

6. The method of claim 1 wherein the compound which undergoes a neutralization reaction with hydrogen chloride is in the form of an aqueous solution.

7. The method of claim 1 wherein the compound which undergoes a neutralization reaction with hydrogen chloride is in the form of an aqueous suspension.

8. The process of claim 1 wherein the reaction mass is rapidly agitated to constantly renew the interfaces.

* * * * *